Figures 1, 2:
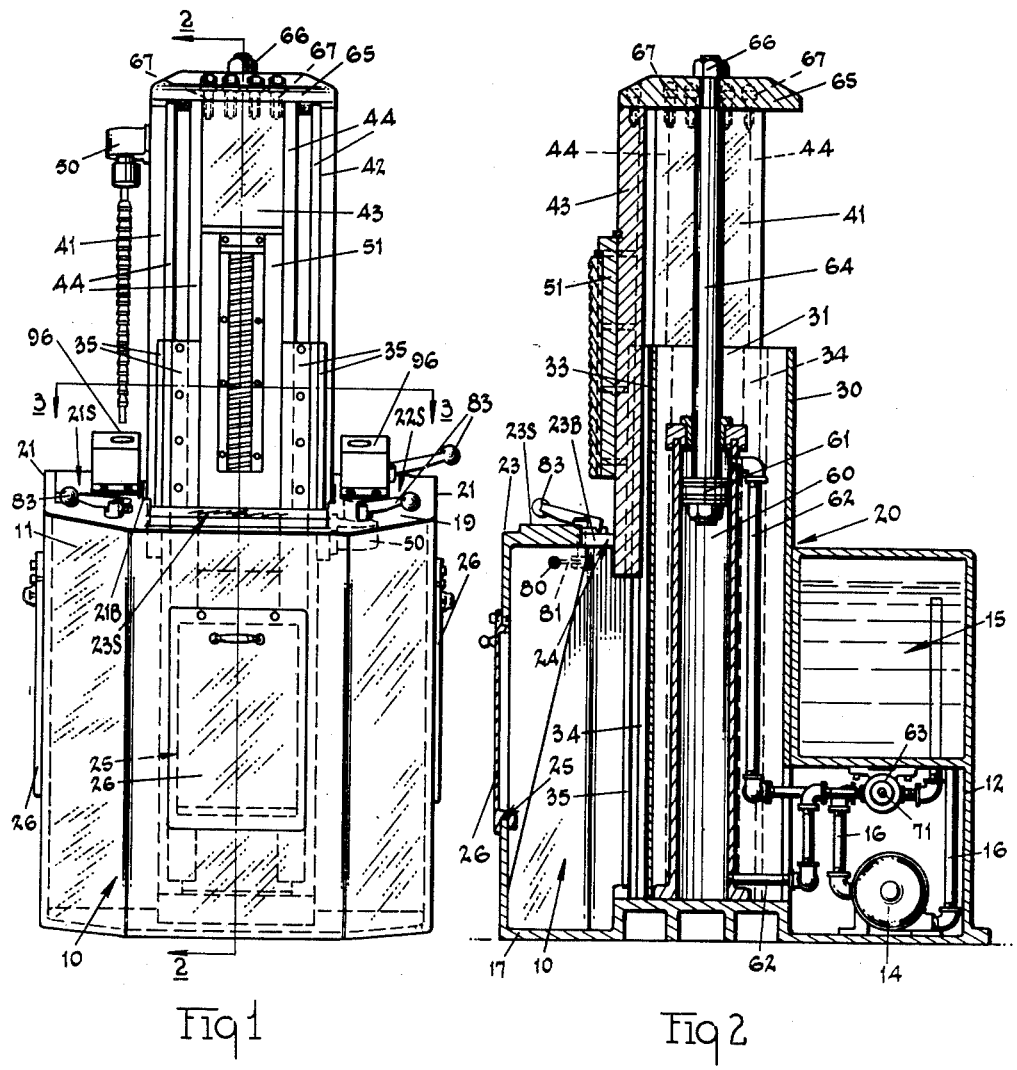

June 30, 1953  E. J. LAPOINTE ET AL  2,643,585
BROACHING MACHINE
Filed Sept. 26, 1951                    2 Sheets-Sheet 1

INVENTORS
Elmer J. Lapointe and
BY Francis J. Lapointe

ATTORNEY

June 30, 1953  E. J. LAPOINTE ET AL  2,643,585
BROACHING MACHINE
Filed Sept. 26, 1951  2 Sheets-Sheet 2
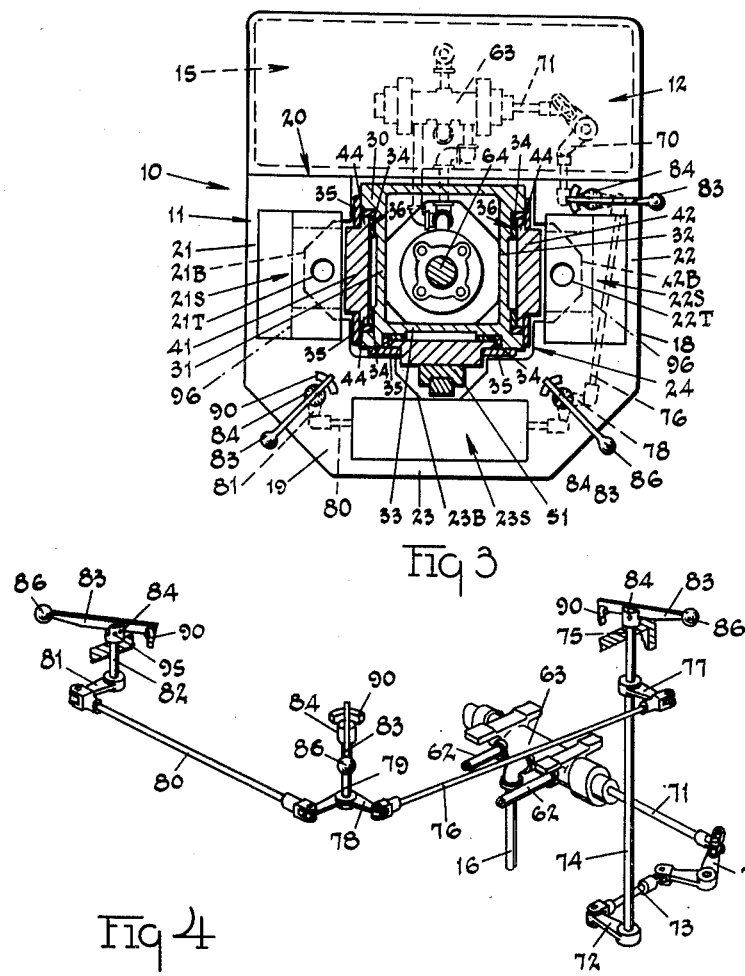
Fig 3
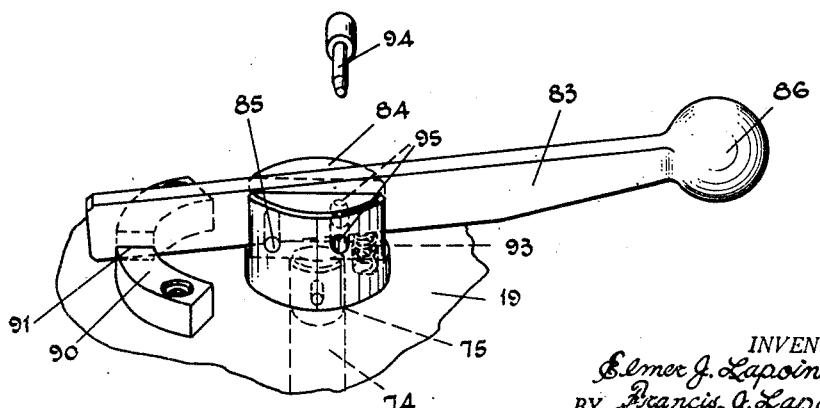
Fig 4
Fig 5
INVENTORS
Elmer J. Lapointe and
BY Francis J. Lapointe
ATTORNEY Patented June 30, 1953

2,643,585

UNITED STATES PATENT OFFICE 2,643,585

BROACHING MACHINE

Elmer J. Lapointe and Francis J. Lapointe, Ann Arbor, Mich.

Application September 26, 1951, Serial No. 248,408

6 Claims. (Cl. 90—33)

Our invention has generally to do with broaching machines. More particularly, our invention deals with the problem of performing multiple broaching operations, either of the same, different or progressive nature, on a single machine and within the floor and overhead space occupied by a conventional broaching machine and its base.

Our invention concerns a universal broaching machine wherein, for example, push, pull and surface broaching, either up or down, may be all done at one time or at successive times without there being waiting time for retooling or rerigging between successive operations. Many of the so called "universal" machines of the prior art require retooling or rerigging intervals, in order that subsequently different broaching operations may be done. We, by our present invention, eliminate this.

Our invention besides saving production time makes possible a nearly complete utilization of production space, another expensive overhead item in product cost. Also by our invention, when engaged in progressive broaching operations, there is a great reduction in material handling, still another product cost element. So our invention makes production economies possible and hence enables the resultant product to be made faster and cheaper.

Aside from the foregoing objects, we propose by our invention to construct a broaching machine of the vertical upright type having a plurality of working stations. Particularly, we propose the disposition of such working stations at different quarterings about the machine. Thus, operators, work loaders or unloaders may stand, without crowding, so as to each perform their respective tasks at each station. Heretofore, in many multiple broaching machines, the working stations were disposed adjacent or "in line" with each other. This often caused confusion and conflict between work loading personnel at each station or required limiting the number of workers active at one time. Thus, the production speed ordinarily to be expected was materially reduced.

Also, we have as an object to provide a broaching machine having a pedestal type base and a guideway bearing column for a plurality of tool holder slides projecting upwardly from points on the base spaced inwardly from a plurality of the base edges to form horizontally extending work support stations between the lower end of the column and the base edges arranged in nearly a planetary relation around the column. With the guideways on the column flank in registering alignment with such working stations, the tool holder slides and tools carried thereby may be made to reciprocate vertically through such stations. Such grouping enables the slides to be driven by a single power transmitting means such as a main cylinder and piston resulting in still further operation and maintenance economies.

We also propose by our invention to provide on the broaching machine column, guideways and tool holder slides having a stroke and length in relation to such stroke that the upper and lower ends of the tool holder slide remain on their respective upper or lower side of the work supporting station, notwithstanding reciprocation of the slides. In making this provision we are able to mount tool holding fixtures on either end of the slides and thus obtain push or pull in an up or down direction as desired. We propose that an auxiliary table at the work station be used for all up stroke broaching. Such addition is of minor consideration when the costs of separate machines to obtain separate up and down broaching are contemplated.

A still further object of our invention is to provide an operator's control system for the hydraulic means used for actuating the several work slides. The need for this provision becomes most apparent when production conditions require a crew of operators or work loaders to be employed in a group about the machine, each of whom is assigned to one station. The problem then, as will be seen, is to control the machine operation, without endangering or injuring any operator. We provide a system of interlinked lock-out operating levers from all operating stations to the prime moving hydraulic means. By this arrangement each operator can lock out operation of the linkage until loading or other operation has been completed at his station and he has removed himself to a safety position.

Another feature of our control system resides in the fact that, in single operator operation, the lock-outs at all unoccupied stations may be put in open position and control exclusively exercised by the single operator from a chosen station and while remaining at his chosen station.

The invention consists in other features and advantages which will appear from the following description and upon examination of the drawings. Structures containing the invention may partake of different forms and still embody the invention. To illustrate a practical application of the invention, we have selected a broaching machine as an example of the various structures and details thereof that contain the invention.

We shall describe the selected structure hereinafter, it being understood that variations may be made without departing from the spirit of the invention. The particular structure selected is shown in the accompanying drawings and described hereinafter.

Fig. 1 of the accompanying drawings illustrates a perspective elevational view of a broaching machine embodying the features of our invention. Fig. 2 illustrates a view of a longitudinal section taken along the plane of the line 2—2 indicated in Fig. 1. Fig. 3 illustrates a view of a horizontal section taken along the plane of the line 3—3 shown in Fig. 1. Fig. 4 illustrates, partly in schematics, the control system and hydraulic actuating means of the machine shown in Fig. 1. Fig. 5 shows an element of the control system.

The embodiment of our invention shown in the accompanying drawings has a pedestal base 10. Preferably, the base 10 comprises a table part 11 and an extension part 12. The extension part 12 houses and supports elements of the machine, such as a hydraulic pump 14, a sump 15, containing oil, and piping 16 interconnecting the pump and sump to a machine hydraulic operation means located in the table part 11. The table part 11 of the base 10 supports an upstanding column 30 over which the machine slides, to be described, are designed to move in response to said hydraulic operating means.

The table part 11 is a sturdy and rigid weldment having floor pads 17, enclosing side walls 18 and top walls 19. Viewed top-side (see Fig. 3), the table part 11 has a six-sided outline, one side being longer than any other and connecting opposite ends of the first and fifth side. Along this longer side, indicated 20, the extension part 12 of base 10 housing the pump and sump is located.

The opposite sides indicated 21 and 22 immediately adjacent said longer side 20 are parallel to each other and normal to said longer side. These sides 21 and 22 together with the intermediate side, indicated 23, extending parallel and opposite to the long side 20 mark separate work stations quartered about the machine.

The top wall 19 of the table 11 has an opening 24 through which the column 30 extends and, in part, is supported. The opening 24 is formed in inwardly spaced relation from the outer edges of the top wall 19 where it intersects with side walls 18 of the mentioned sides 21, 22 and 23. The surface areas of the top wall 19 between said edges and the column 30 provide work support surfaces 21S, 22S and 23S. The opening 24 has bays 21B, 22B and 23B which adjoin the work support surfaces. The bays are of a shape and size allowing work slides on the column 30 to pass therethrough. As will be explained later, this provision allows for surface, push up and pull down broaching. In that connection the walls 18 of the table part 11 may have suitable access openings 25 through which the lower end of the column 30 and the underside of the work surfaces may be reached. These openings 25 may be closed when not in use by doors 26. Also certain work surfaces, such as 21S and 22S, may have broach tool-way openings 21T and 22T. These openings allow a broaching tool to pass through the plane of the work surface as required in usual internal broaching operations.

Broaching tools are mounted on our machine by means of heads on work slides movably supported on the column 30. The column 30 has a plurality of guideways, corresponding in number and position about the vertical axis of the column 30 with the number and location of the work surfaces. Each guideway extends substantially the entire length of the column 30 so as to provide sliding support to the work slide for a considerable lineal extent.

The particular guideways shown in the drawings are generally indicated 31, 32 and 33 respectively serving work supporting surfaces 21, 22 and 23. The guideways are each similar in structure and accord with that commonly used in the prior art. They each have cooperating pairs of slide-backing shoe strips 34 and front capping strips 35 mounted in a channel 36 formed in the column. The strips 34 and 35 are accurately spaced to allow guides formed on a working slide to pass therebetween. The guideways extend substantially the entire length of the column 30.

We show the relation of the guideways to working slides in Fig. 3 of our drawings. There working slides 41, 42 and 43, in work registering relation to work supporting surfaces 21S, 22S and 23S, are shown mounted in the guideways 31, 32 and 33. Each slide has a pair of guide ribs 44 slidably engaging the facing inner surfaces of strips 34 and 35 in a manner well known in the art. Each slide is substantially as long as the column. By this provision each slide through its pair of guide ribs extensively engages its respective bearing strips 34 and 35 and thus resists any tendency to cock during broach working whether pushing or pulling the tool either up or down.

Each working slide carries a tool holder such as those indicated at 50 and 51. The tool holders are designed to be easily removed and remounted on the working slides. Thus, the tool holder 50, mounted on slide 42 for push up broaching, may be removed and remounted for push down, like the holder 50 on slide 41. So also the surface broach holder 51 on slide 43 may be replaced by one like that on slide 41, as needs require.

By mounting a series of progressive broaching tools in the several holders on the slides or a plurality of different type tools, that is internal and surface types, on such slides a variety of work can be produced. Work handling time and costs will be greatly reduced. Also there will be savings in space utilization as well as eliminating the need for owning separate machines to do each type of broaching. When the machine of our invention is tooled for the same work at all stations, it can produce as fast as a battery of three single machines can produce.

The slides 41, 42 and 43 are caused to reciprocate relative to the work support surfaces, preferably, by hydraulic means. Most preferably, the slides are all operated from a single hydraulic power means. Such means is provided by the cylinder 60 and piston 61 connected by piping 62 through a control valve 63 to the pump 14.

Cylinder 60 is mounted within the column 30 in vertical upstanding position. The cylinder has upper end and lower end ports by which oil under pressure may be introduced, first into one end while being withdrawn from the other end, and subsequently into the other end while being withdrawn from the first mentioned end. The flow to each particular port is determined by operation of the valve 63, a four-way valve for the well known construction.

The piston 61 is double acting. When oil enters the upper port of cylinder 60, the piston moves downwardly. When, on the other hand, oil enters the lower port of the cylinder 60, the piston moves upwardly. The piston 61 has a rod 64 which extends vertically and axially relative to the column 30. At the upper end of the rod 64 there is a cap or top plate 65 attached thereto by the nut 66.

The top plate 65 connects the slides 41, 42 and 43 to the pistons. Such connection may be effected by means of a plurality of machine bolts 67 as shown. The bolts 67 extend through the edges of the top plate 65 and into the ends of the slides. By connecting the plurality of slides to the top plate in this described manner the slides are each braced against individual tilting or cocking, while subjected to the strain of working.

Thus, as the piston 61 reciprocates the slides, the tools carried thereby will move through their working strokes.

In order to control the time at which such working strokes occur, means is provided to control the operation of the valve 63. Also that such operation shall not endanger the operators, when a number of them are working at the machine during the same time, we provide means for operating the valve 63 which automatically locks against operation at each station and must be positively released before operation can be effected at any station. Said means includes a plurality of manually operable control levers and linkage preferably beneath the top wall 19 for connecting the control levers to each other and to a movable valve element in the valve 63.

The linkage shown partly diagrammatic in Fig. 4 is adapted for use on the machine of Fig. 1. Essentially, the linkage includes a bell crank 70 pivotally connected at one of its arms to a movable valve element 71 of valve 63. The opposite arm of bell crank 70 is connected by link 73 to rock-lever 72. Rock-lever 72 is keyed to and supported by shaft 74 journaled in bearing 15 in the top wall 19 at a point within the area of working surface 22S. By rotating the shaft 74, the lever 72 and bell crank 70 are rocked to move the valve element 71. Movement of the valve element 71 in one direction connects one end of the cylinder 60 with the pump 14 to cause movement of the piston 61 and tool carrying slides in one direction. Movement of the valve element 71 in the other direction connects the other end of the cylinder to the pump and causes return movement of the piston 61 and tool carrying slides.

In order to extend the control over the operation of the movable valve element 71 to points convenient to operators at other stations, we pivotally connect a link 76 to a second rock-lever 77 on shaft 74. The link 76 pivotally connects with bell crank 78 mounted on and keyed to a shaft 79. Shaft 79, like shaft 74, extends upwardly through and journals in an opening in the top wall 19 within the area of work supporting surface 23S. Thus, by rotating shaft 79, assuming there is no restraint exerted to the rotation of the shaft 74, the valve element may be moved and controlled from a position convenient to the operator working at that station.

In addition we provide a link 80 connecting the bell crank 78 to the arm of a single arm rock-lever 81. Rock-lever 81 is mounted on and keyed to a shaft 82. Shaft 82, like shafts 74 and 79, extends upwardly through and journals in an opening in the top surface 19 in the area of work supporting surface 21S. Thus, by rotating shaft 82 the described sequence of links may be actuated to move the valve element 71 as previously explained from a position convenient to the operator using the work supporting surface 21S.

In order to rotate shafts 74, 79 and 82, we provide manually operable control levers 83. One of these namely the one connected to shaft 74, is shown in Fig. 5 of the drawings. The upper end of shaft 74 is connected to a turret or head 84. The head 84 may be slotted to provide a yoke within which the shank of the control lever 83 is placed. A pivot pin 85 extends through suitable openings in the head 84 and the shank of the lever 83 to pivotally connect the two. The lever has a convenient handle 86. Thus, by turning the lever 83 about the axis of its respectively connected shaft, the described links 73, 76 and 80 connected with the valve element 71 are actuated.

To provide means automatically locking each lever 83 against operation, we provide an arcuate bearing block 90 adjacent each lever 83. The bearing block 90 has a recess or notch 91 into which an end of the lever may enter. The block 90 is mounted in concentric relation to the head 81 so that the lever 80 rides over the block as the lever is rotated to change the position of the valve element 71. The lever 83 is in alignment with the notch 91 when it occupies its midway or neutral position. Then the valve element 71 is positioned to connect the pump 14 to the sump 15 and the piston 61 retained against movement. Hence, by locating any one of the control levers 83 in engagement with the notch 91 on its respective bearing block 90, the remaining levers 83 will be prevented from moving and the machine cannot be operated. This protects each operator from the dangers of one operator actuating the machine before all operators are ready and are standing clear.

We provide means, in the spring 93 housed in the head 84 and bearing against the lever 83, for urging the lever to enter the notch 91. This provides a degree of automatic check on operation of the several levers 83. In order to lock out the mentioned check, say at stations not being used or manned, we provide means for holding the levers 83, at the unmanned stations, against responding to the action of their respective spring 93. Such means is embodied in an insertable pin 94 which when positioned extends through registering openings 95 in the head 84 and engages the lever 83. The pin 94 holds the lever 83 against entering the notch 91.

An auxiliary work table 96 may be used for up broaching operations. The table 96 is removably clamped, in a well known manner, to a work supporting surface at the station where up broaching is to be done.

Assuming the machine has been tooled as shown in Fig. 1 and is in the up position shown, operation continues by first loading work at the stations having work supporting surfaces 21S and 23S. As each operator at these stations completes his task of placing the work in position, he will try to shift the lever 83 at his station. Being unable to do so because of the check on operation exercised by the lever 83 engaging notch 91 at the other station, the operator will depress the lever 83 at his station and manually retain it so. Then when the other operator has completed loading at his station he, too, will depress the lever 83 at his station. Assuming the levers 83 at the stations having work supporting surfaces 21S and 22S are being held depressed by the operators there, all levers 83 are free and the linkage may be operated to move the element 71 of valve 63 causing oil under pressure to enter the upper end port of the cylinder 60. This moves the piston 61 and the slides perform a working stroke at the stations having work surfaces 21S and 23S.

Now the operator at the station having work supporting surface 22S may load work and chuck the broach tool in head 50 through opening 25 at his station, in preparation for up stroke broaching being done at his station. If desired the operator at 23S station may unload but the operator at 21S must unload the finished work, the tool at his station having unchucked from head 50. The free tool is retrieved through opening 25 from below the top surface 19. When the operator at the 22S station has loaded work and stands clear, he moves the lever 83 at his station in a direction toward actuating the valve element 71 to connect the pump with the lower end port of the cylinder 60. In thus moving the lever the links cause all remaining levers 83 to move in the course of which each passes over the notch 91 in the bearing block at each station. If the operators there do not depress their respective levers 83 to clear the notch 91, the further movement of the linkage is resisted and the valve element 71 held in neutral position. By this arrangement the attention and consequent safety of all the operators at the other stations is insured.

Assuming now that they have all depressed the levers 83 at their stations, the operator at the 22S station continues to move the lever 83 at his station until hydraulic connection is made between the pump and the lower port of the cylinder. Then the piston and slides move upwardly. This completes the work at station 22S and enables new loadings to be effected at the other stations. From then forward new cycles repeat as before.

If it is desired to operate the machine from a single station as when one tool only is to be actuated, we use the pins 94 to lock out the levers 83 at the stations not in use, as was explained.

Hence, our machine has manifest adaptability and produces great savings in broach operations and machine costs.

While we have illustrated and described the best form of our invention now known to us, as required by the statutes, those skilled in the art will readily understand that changes may be made in the disclosed construction without departing from the spirit of our invention as set forth in the appended claims.

We claim:

1. A vertical broaching machine having a pedestal base with a horizontal upper end surface, said upper end surface of the pedestal base having at least three edges, two of which are opposite and parallel to each other and the third intermediate and normal the mentioned two edges, a column in normal relation to said surface and upstanding therefrom at points approximately equally spaced inwardly of the mentioned edges whereby the areas of said surface between said edges and column provide three work stations not in line, the column having a plurality of lateral faces in alignment each with one of said working stations; each lateral face having a slideway; a plurality of slides; each slide in slidable engagement with one of said slideways and adapted to be guided in reciprocation to and from said working stations; a tool connector on each slide adapted to removably engage and support a broach tool; and actuatable means in operative connection with each slide adapted to reciprocate each slide relative to its work station whereby a multiple of broaching operations may be effected around said column and on the floor space area occupied by said pedestal base.

2. A vertical broaching machine having a pedestal base with a horizontal upper end surface; a column in normal relation to said surface and upstanding therefrom at points spaced inwardly from a plurality of edges thereof and providing in the areas of the surface between the column and said edges a plurality of separate working stations at different quarterings about the column; the column having a plurality of lateral faces in alignment each with one of said working stations, each lateral face having a slideway; a plurality of slides; each slide in slidable engagement with one of said slideways and adapted to be guided in reciprocation to and from said working stations; a tool connector on each slide adapted to removably engage and support a broach tool; actuatable means in operative connection with each slide adapted to reciprocate each slide relative to its work station whereby a multiple of broaching operations may be effected around said column and on the floor space area occupied by said pedestal base, interconnected movable means at each station for actuating said actuatable means and including a manually releasable element normally resistant to movement of said movable means to actuate the actuatable means.

3. The vertical broaching machine described in claim 1 in which said actuatable means comprises a hydraulic cylinder and piston, a fluid pump, a source of fluid, conduits connecting the source of fluid to the pump, other conduits connecting the pump and the source of fluid to the cylinder, a valve in the line of said other conduits operable when in one position to connect the pump with the cylinder and the cylinder with the source of fluid and when in another position to connect the pump with the source of fluid and a manually operable lever at each station operatively connected to each other and to the valve and adapted to move the valve.

4. The vertical broaching machine described in claim 3 having in addition a guide block at each station in sliding engagement with said manually operable lever thereat, each guide block having a notch adapted to receive the lever as it moves in sliding engagement with the block and comes to a position moving the valve to connect the pump to the source of fluid.

5. The vertical broaching machine described in claim 4 having in addition resilient means engaging each lever biasing the lever to enter said notch.

6. The vertical broaching machine described in claim 5 having in addition a movable part at each station operable to engage the lever at said station and retain the same against responding to said resilient means and entering said notch.

ELMER J. LAPOINTE.
FRANCIS J. LAPOINTE.

References Cited in the file of this patent

UNITED STATES PATENTS

| Number | Name | Date |
|---|---|---|
| 1,958,501 | Thompson | May 15, 1934 |
| 2,190,642 | Ferris | Feb. 20, 1940 |
| 2,307,228 | Monroe | Jan. 5, 1943 |
| 2,507,581 | Waters et al. | May 16, 1950 |